United States Patent

Thoma et al.

[11] Patent Number: 6,058,704
[45] Date of Patent: May 9, 2000

[54] RADIAL PISTON HYDROSTATIC TRANSMISSION OF THE TYPE INCORPORATED INTO A HORIZONTALLY-SPLIT HOUSING STRUCTURE

[75] Inventors: Christian Helmut Thoma; George Duncan McRae Arnold, both of Jersey, United Kingdom

[73] Assignee: Unipat AG, Glarus, Switzerland

[21] Appl. No.: 09/044,903

[22] Filed: Mar. 20, 1998

Related U.S. Application Data

[60] Provisional application No. 60/041,567, Mar. 21, 1997, and provisional application No. 60/053,389, Jul. 22, 1997.

[51] Int. Cl.⁷ .................................................. F16D 39/00
[52] U.S. Cl. ............................................. 60/487; 91/498
[58] Field of Search ................................ 60/487; 91/492, 91/498

[56] References Cited

U.S. PATENT DOCUMENTS

| 5,042,252 | 8/1991 | Havens et al. | 91/498 |
| 5,177,967 | 1/1993 | Von Kaler et al. | 60/487 |

FOREIGN PATENT DOCUMENTS

| 470842 | 4/1952 | Italy | 60/487 |

*Primary Examiner*—F. Daniel Lopez
*Attorney, Agent, or Firm*—Young & Thompson

[57] ABSTRACT

A hydrostatic transmission having a housing for an internally disposed variable-displacement hydraulic pump and fixed-displacement hydraulic motor, a framework for supporting the hydraulic pump and motor components within said housing in a manner whereby the loads generated by the pressure medium flowing between pump and motor are absorbed into the framework. The framework to support a pintle-valve which as the fluid coupling means between pump and motor.

20 Claims, 8 Drawing Sheets

RADIAL PISTON HYDROSTATIC TRANSMISSION OF THE TYPE INCORPORATED INTO A HORIZONTALLY-SPLIT HOUSING STRUCTURE

CROSS-REFERENCE TO RELATED APPLICATIONS

This application claims the benefit under 35 U.S.C. 119(e) of provisional applications Nos. 60/041,567 filed Mar. 21, 1997, and 60/053,389 filed Jul. 22, 1997.

BACKGROUND OF THE INVENTION

The present invention relates to hydrostatic radial piston machines deployed in power transmission and transaxle product and more particularly, is concerned with improving the layout of the hydrostatic components within the housing by way of a novel arrangement whereby such components can be located, mounted and supported in the surrounding housing structure.

Hydrostatic transmissions act as means for converting rotary mechanical motion, typically prosvided by an internal combustion engine, to fluid motion by means of a shaft driven hydraulic pump and where the pump is fluidly connected to a hydraulic motor, the volume and direction of the fluid delivery to the motor is governed by the displacement setting of the pump, and the motor is the mechanism for converting the fluid motion back to mechanical rotary motion. By regulating both the amount and direction of fluid motion between the pump and motor, usually achieved through the use of a variable-displacement pump, the output speed and rotational direction of the motor can be precisely controlled at a set input rotational speed of the pump. This device is useful in driving vehicles such as lawn and garden tractors or any apparatus requiring precise speed control. In many of such applications, the hydrostatic transmission is ideally integrated as part of a transaxle driving apparatus which further incorporates speed reducing means and, if the applications requires it, a differentialled axle of the type shown in U.S. Pat. No. 4,979,583 entitled Variable Speed Transaxle.

In the type of hydrostatic transmission employing radially arranged pistons, both pump and motor use cylinder-barrels which are preferably arranged to rotate on a common pintle-valve. Pistons are disposed within cylinders in both the pump and motor cylinder-barrels and protrude from their respective cylinders to be operatively connected to respective surrounding annular track-rings, and where the track-ring of the pump is adjustable in its position relative to the pintle-valve such that its eccentricity can be changed enabling the delivered fluid medium to be varied in both quantity and direction to the hydraulic motor. The track-ring of the hydraulic motor is normally held in a permanent eccentric position to the pintle-valve. Fluid delivered by the pump through the pintle-valve is thereby directed to the motor to enter each of the cylinder chambers in turn that are provided in the cylinder-barrel of the hydraulic motor. The eccentricity of the pump track ring can therefore be changed by the operator of the machine, and for example, this can be simply accomplished by pivoting the track-ring about an axis located at one end of the track ring, this axis define; generally being a pivot pin. In addition, a control mechanism is also provided so that the track-ring can swing or pivot about the axis of the pivot pin so that the eccentricity of the track-ring relative to the pintle-valve is alterable Such a hydrostatic transmission is shown in U.S. Pat. No. 5,078, 659, entitled Variable Speed Transaxle, which is specifically incorporated herein by reference.

Hydrostatic transmissions of the type which are fully integrated in a transaxle housing structure which also contains within both speed reducing gearing and a mechanical differential are fast becoming the preferred driving apparatus for lawn tractors and the like. However, there are also many applications were the hydrostatic transmission is a "stand-alone" machine and this invention is applicable to both arrangements.

In the variable speed transaxle as disclosed in the '659 patent, the hydrostatic transmission is totally encapsulated inside a purposely formed internal chamber as defined by the surrounding housing structure of the transaxle, and comprises an input shaft driven hydraulic pump which is fluidly coupled to the hydraulic motor by means of a pintle-valve, the motor being connected through speed reduction gearing and differential to output axle shafts on which, in the case of a vehicle application, the wheels of the vehicle are attached. The transaxle housing structure is comprised of two housing elements which are fixed together along a horizontal parting-plane, also called the peripheral seam, the top element being the "cover" and the bottom element being the "case". The input drive shaft is supported by bearings in the cover and where a bevel pinion is attached to the shaft allowing the rotational drive axis to be displaced through ninety degrees by means of meshing with a complementary bevel geal attached to the cylinder-barrel of the pump. The bevel gear and cylinder-barrel assembly rotate about the cylindrical pintle-valve and where one or more saddle clamps are used to fixedly locate and position the pintle-valve onto part-cylindrical machined surfaces provided in the interior of the case. The pivot pin used to support the pump track-ring is held in place between respective pairs of part-cylindrical machined pockets in the case and cover, and the motor track-ring may also be held on pins as shown or alternatively, be held in place between machined pockets in the case and cover. As a result, the housing structure for such prior hydrostatic transmissions requires that both the case and cover be machined in order that the hydrostatic components can be accurately located in position. Furthermore, with this prior art construction, the loads acting on the hydrostatic components such as the pintle-valve, track-ring and pins as generated by the pressurised fluid medium acting on the pistons elements have to be absorbed directly into the surrounding housing structure through the associated machined pockets.

The present invention is a significant advance on the prior art hydrostatic transmissions of the type described above as it eliminates the requirement to machine the case element of the housing for location and support surfaces for the hydrostatic components. Furthermore, the invention provides a new solution whereby the force loads generated by the pressurised fluid medium acting on the piston elements are contained and absorbed within a framework rather than directly to the housing. As a result, thinner wall sections can be used in the housing allowing an attendant overall weight saving in the unit.

In a further embodiment of the invention, the framework structure is formed as part of a subsidiary housing member, and where the subsidiary housing member is machined such the comparatively larger sized cover and case housing members can be used in the die-cast state. This construction simplifies manufacture of the product in that all the machining operations can be carried out in the smallest of the three housing members, allowing the use of a smaller and less expensive CNC machiningcenters.

SUMMARY OF THE INVENTION

From one aspect the invention consists in a housing structure comprising a case member and a cover member connectable together along a parting-plane to form an internal chamber for a radial piston hydrostatic transmission. An input shaft is rotatably supported in the housing structure, preferably in the cover member, the input shaft being operatively connected to the cylinder-barrel of the pump. The pump cylinder-barrel is fluidly coupled to the cylinder-barrel for the motor by means of a pintle-valve. The motor cylinder-barrel is operatively connected to an output shaft. The output shaft may be connected to speed reducing gearing that may also be contained and supported within the housing structure in the case of a hydrostatic transmission and gear reduction product. When the invention is applied to a transaxle product, the speed reducing gearing is connected to an mechanical differential driving axle shafts. A framework is included that holds certain components of the hydrostatic transmission which would otherwise have to be tied directly to the housing. In this respect, the framework may best be comprised of first and second elements, and where in combination or separately they hold the pintle-valve and track-ring support pins. Both first and second elements comprising the framework are fastened to the cover member such that the loads generated by the pressurised fluid medium are absorbed into the framework rather then directly into the housing.

A number of machined surfaces are provided in the interior of the cover member to which the framework is located, and a number of fastening screws are used to lock the framework to the cover member. As the loads produced by the pistons subjected to pressurised fluid are absorbed into the framework, the case and cover members are now subject to less stress than the prior art described earlier leading to a much improved and robust transmission product. As the mounting surfaces in the interior of the cover member require only relatively simple spot-face machining operations, such operations can be advantageously be carried out during the same machining cycle when the aperture for the bearings and seal of the drive shaft is machined.

According to the invention from another aspect, the framework for the hydrostatic transmission components is attached to a subsidiary housing member and where the subsidiary housing member is machined in various respects for the location of the framework as well as to provide the necessary support and location points for elements such as the bearings and rotary seal for the input drive-shaft. Thereby, the hydrostatic components can now be mounted in the subsidiary housing member and locked in place by means of the framework before this complete sub-assembly is married to the case and cover members of the transmission or transaxle. An opening being provided in the cover member through which that portion of the subsidiary housing member can protrude through, and where the subsidiary housing member is provided with a flange which is fastened to the inner junction surface of the cover member which is offset from the peripheral seam. In this respect, as both case and cover member no-longer require that any machining operations be carried out, they can be of thinner wall construction as the subsidiary member, is constructed sufficiently strong to the force loads generated by the working pressure inside the hydrostatic transmission. As a result, only relatively small residual loads are transferred to the cover member.

It is therefore one object of the invention to eliminate machining on at least one of the two housing members, called the case and cover, which together comprise the horizontally-split housing structure for a hydrostatic transmission or transaxle. It is a further object of ale invention to absorb all or most of the generated loads from the working pressurised fluid medium by means of the framework shown and described in this invention.

It is a further object of the invention to carry out all machining operations in a subsidiary housing component so that both main housing elements can be used in the die-cast received state from the supplier.

What is needed in the art is a compact and inexpensive hydrostatic transmission or transaxle where the amount of machining needed to be carried out is consigned to one rather than two housing members, preferable in a manner that would allow both thinner wall sections in the case and the cover, and such that at least the case can be used in an as cast or supplied state.

In one form thereof, the hydrostatic transmission of the invention comprises an internally disposed hydrostatic transmission within a housing; said housing comprising a case member and cover member and where said case member and cover member are joined together along a peripheral seam; said hydrostatic transmission comprising a variable-displacement radial piston hydraulic pump and a fixed-displacement radial piston hydraulic motor fluidly coupled together by a pintle-valve; an input drive-shaft rotatably supported within said housing and operatively connected to a cylinder-barrel of said radial piston pump; an output drive-shaft supported between said case member and said cover member and operatively connected to a cylinder-barrel of said radial piston motor; said cylinder-barrels of said radial piston pump and motor having an array of cylinders each containing a piston, the pistons operatively connected to respective surrounding annular track-rings; a framework within said internal chamber to which said hydrostatic transmission is carried and arranged to locate and support said pintle-valve and at least one said track-rings, and where the interior of said cover member is provided with interior mounting surfaces or downwardly extending bosses for the attachment of said framework.

For ease and convenience, the illustrations and description of this invention refer to a "stand-alone" hydrostatic transmission although the invention can also incorporate speed reducing gearing and differential when applied to hydrostatic transaxles.

BRIEF DESCRIPTION OF THE DRAWINGS

The above mentioned and other novel features and objects of the invention, and the manner of attaining them, may be performed in various ways and will now be described by way of a examples with reference to the accompanying drawings, in which.

Figure 1:
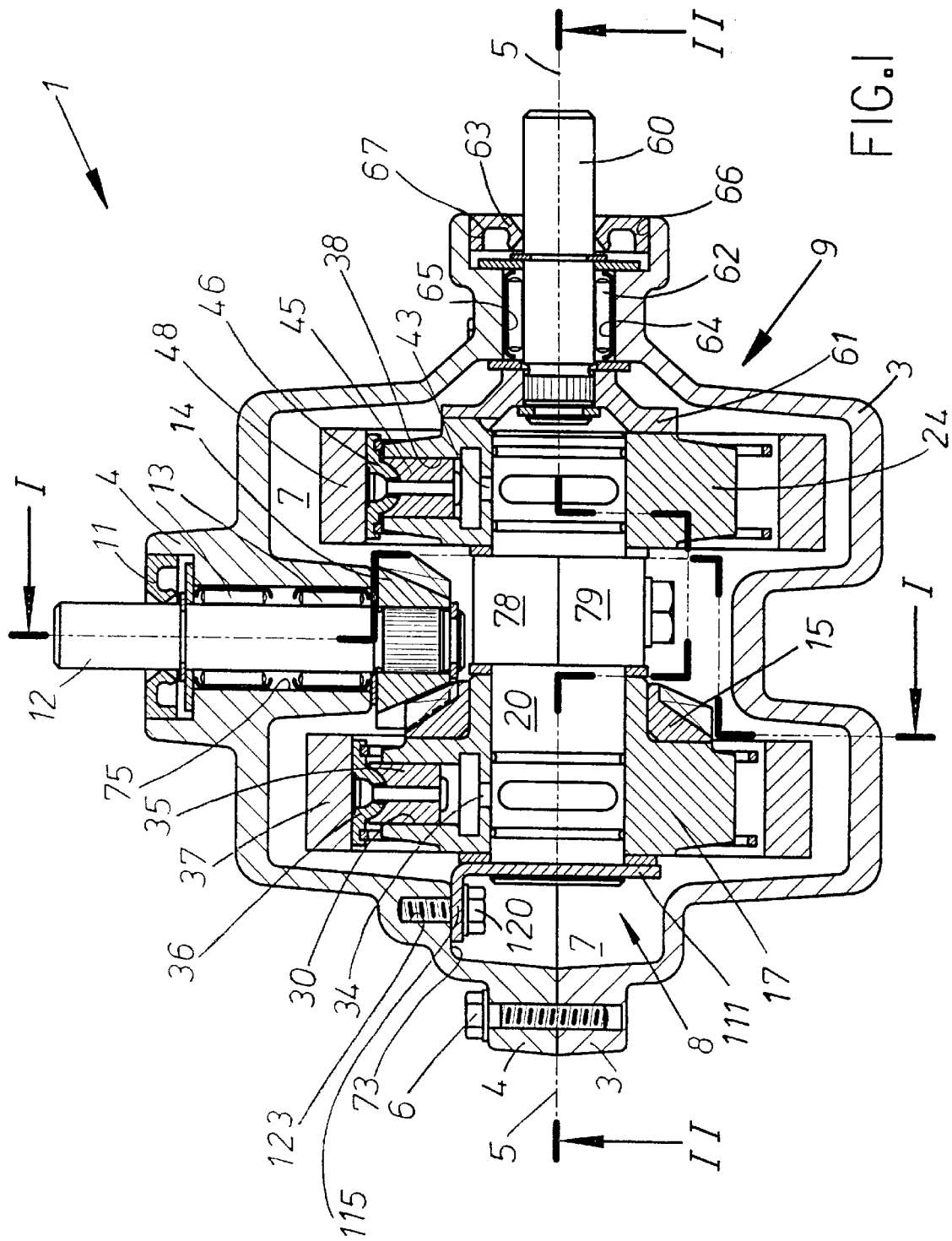
FIG. 1 is a part-sectioned side view of the hydrostatic transmission according to the first embodiment of the invention.

The outer boundary of the hydrostatic transmission or transaxle 1 is defined by a two-piece housing structure in the form of a case 3 and cover 4 which connect together at a peripheral seam along a parting-plane 5 and where a series of screws 6 hold the case 3 and cover 4 together. In the space defined within the case 3 and cover 4, an internal chamber 7 is formed into which the hydraulic pump 8 and motor 9 are located, chamber 7 is flooded with hydraulic fluid which acts as the power transmitting medium for the hydraulic pump 8 and motor 9, and where a rotary seal 11 surrounds the input drive-shaft 12.

The input drive-shaft 12 supported by bearings 13 in the cover connects to drive bevel pinion 14, and where pinion 14 meshes with bevel gear 15. Bevel 15 is supported on cylinder-barrel 17 and attached together to rotate at equal speed. Barrel 17 of the pump 8 is supported for rotation on pintle-valve 20 and where the pintle-valve is provided with internal fluid passages 21, 22 to that fluid from barrel 17 can flow to the cylinder-barrel 24 of the motor 9.

Barrel 7 of the pump 8 is provided with a plurality of cylinders 30 which are a fixed axial distance relative to the arcuate shaped slots 31, 32 provided on the pintle-valve 20. Each cylinder 30 includes a port 34 which matches with arcuate slots 31, 32 during rotation of barrel 17. Each cylinder 30 receives a piston 35 which is riveted to a slipper 36, the slippers 36 being operatively connected to a surrounding annular track-ring 37. Cylindrical pistons with domed ends can be used with this invention as well as ball pistons. The barrel 24 of the motor 9 is likewise provided with a plurality of cylinders 38 which are a fixed axial distance relative to the arcuate shaped slots 40, 41 provided on the pintle-valve 20. Similarly, each cylinder 38 includes a port 43 which matches with arcuate slots 40, 41 during rotation of barrel 24, and each cylinder 38 receives a piston 45 which is riveted to a slipper 46, the slippers 46 being operatively connected to a surrounding annular track-ring 48. For the motor 9, track-ring 48 is eccentrically positioned with respect to the pintle-valve 20, whereas for the pump 8, track-ring 37 is pivotable about pivot pin 50. Control-shaft 51 is connected to track-ring 37 by link pins 52, 53 in order that the eccentricity of track-ring 37 can be varied relative to the longitudinal axis 21 of the pintle-valve 20. When track-ring 37 is moved by control-shaft 51 into an eccentric position relative to the pintle-valve 20, during rotation of barrel 17, the pistons 35 reciprocate radially within their respective cylinders 30 and fluid inside the cylinders 30 is displaced through port 34 and flow takes place between arcuate shaped slots 31, 32. The fluid in passages 21, 22 connect with the motor 9 by way of arcuate shaped slots 40, 41 entering each cylinder 38 in barrel 24 by way of port 43. The fluid entering each cylinder 38 causes the piston 45 to reciprocate and through the relationship to the eccentrically positioned track-ring 48, barrel 24 is caused to rotate. Barrel 24 is connected to an output drive shaft 60 by means of a coupling 61 such that the barrel 24 and shaft 60 rotate at equal speed. Bearing 62 and rotary seal 63 surrounding the output drive-shaft 60 are located with respective pairs of pockets shown as 64, 65 and 66, 67 formed in the case 3 and cover 4 respectively.

The method and means by which the hydrostatic pump 8 and motor 9 are attached to the housing structure will now be described. In the interior of the cover 4, surfaces shown as 70, 72, 73 are spot faced in order to provide a datum with respect to the hole shown as 75 which is also machined into the cover 4 in to which the input-shaft 12 and bearings 13 are positioned.

Figure 2:
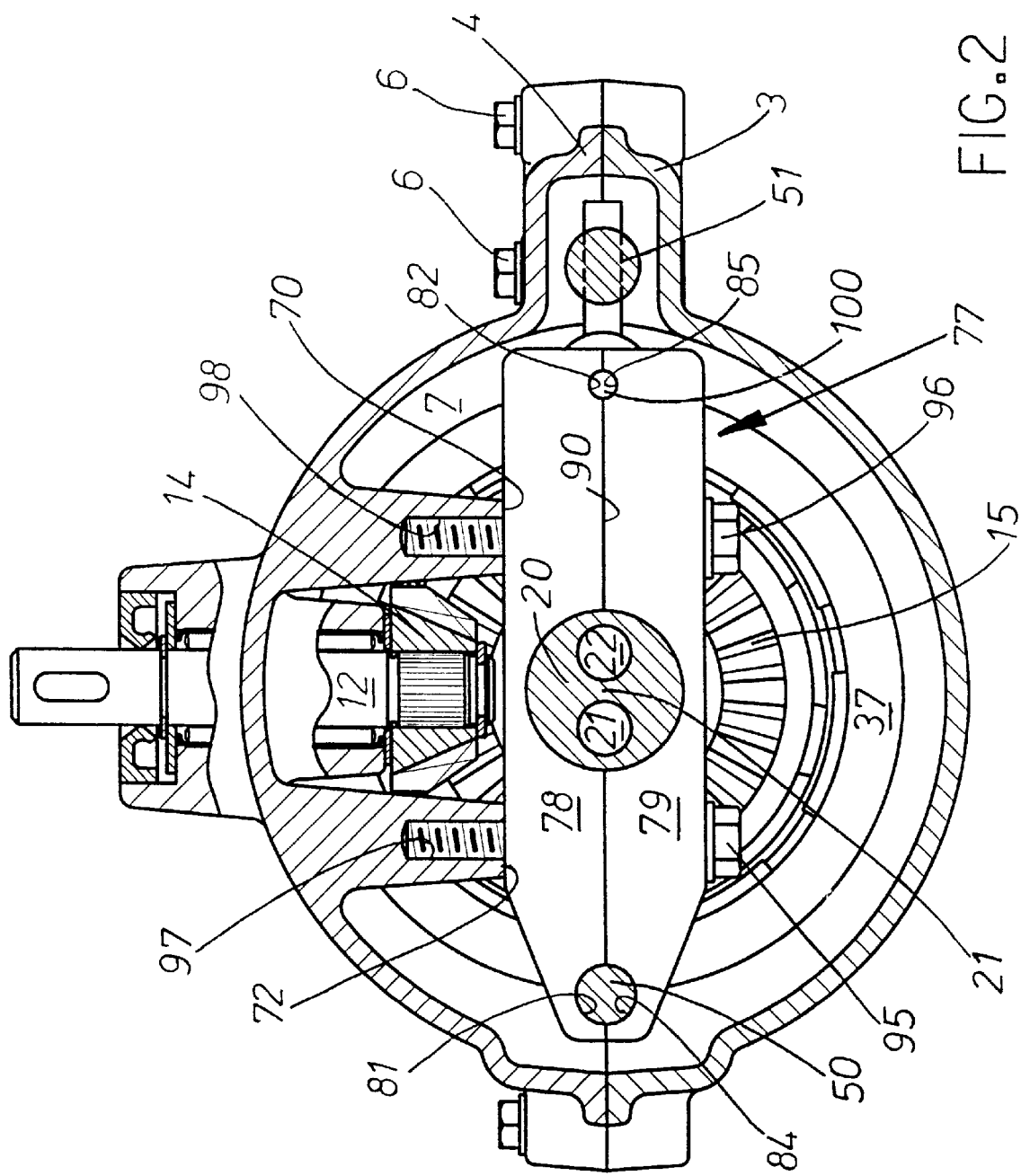
FIG. 2 is a part-sectioned view along section I—I of FIG. 1.
Figure 3:
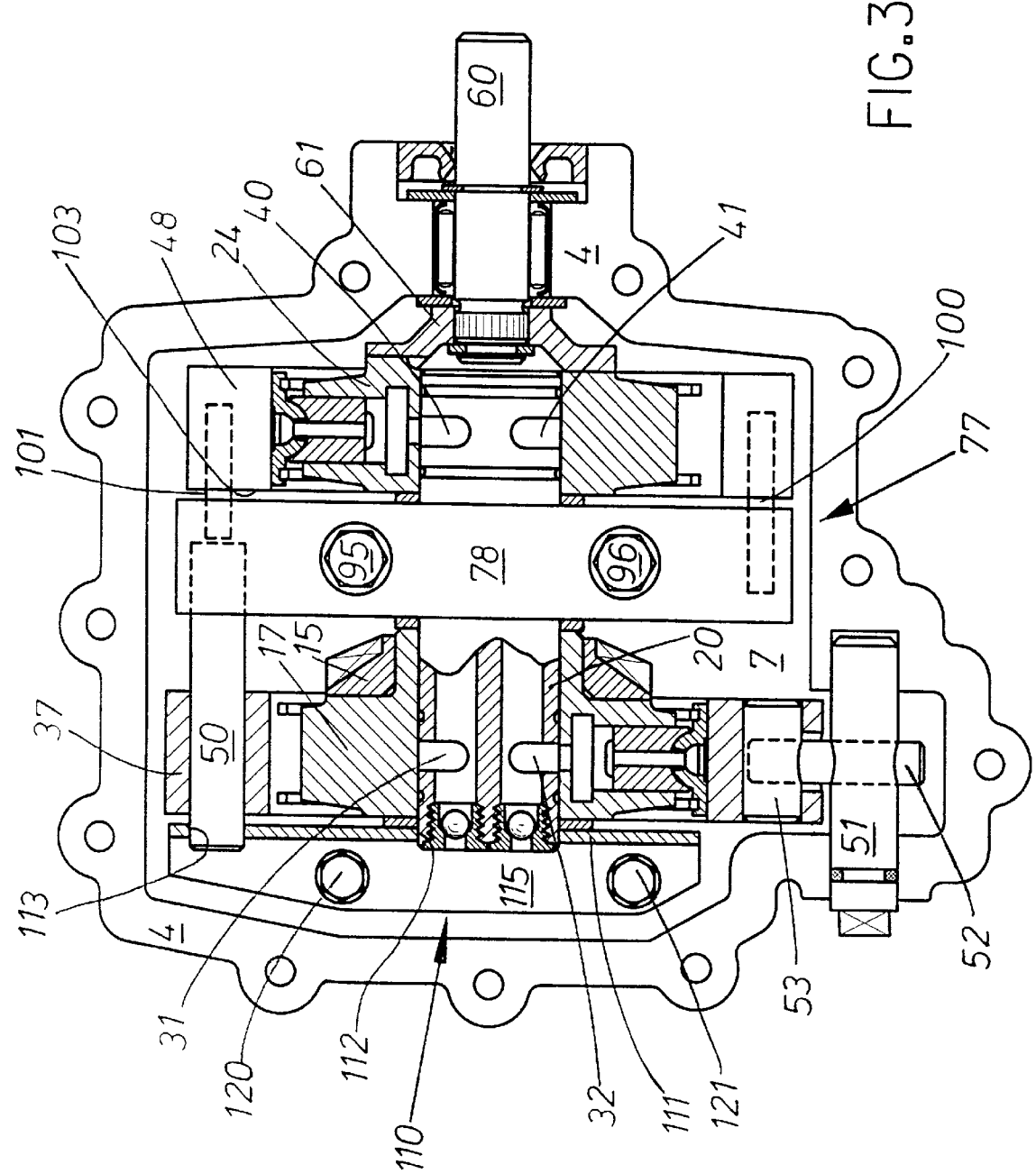
FIG. 3 is a part-sectioned view along section II—II of FIG. 1.

A framework is included which comprises a first element shown as 77 and a second element shown as 110. In-between the pump 8 and motor 9, element 77 is positioned and is preferably comprised of two power-metal parts in the form of male and female members. As shown in FIG. 2, each male and female member 78, 79 is provided with part-cylindrical surfaces shown as 80, 81, 82 for male member 78 and 83, 84, 85 for female member 79. Respective pairs of these part-cylindrical surfaces combine to capture certain components of the hydrostatic unit, for instance, part-cylindrical surfaces 80, 83 wrap around the pintle-valve 20 for its capture whereas part-cylindrical surfaces 81, 84 wrap around the pivot pin 50. Male and female members 78, 79 are joined together along a parting-plane 90, although in practice, a small gap may exist between the male and female members 78, 79 which is unimportant to the functioning of the invention.

Holes or slots (not shown) is both male and female members 78, 79 allow the passage of fastening screws 95, 96 which are received into threaded holes 97, 98 in the cover 4. When the first element 77 of the framework is located onto machined surfaces 70, 72, the action of tightening screws 95, 96 results that male and female members 78, 79 are pressed together and clamp the pintle-valve 20 and pivot pin 50 in place, and the first element of the framework 77 becoming thereby fixedly secured to the cover member 4 of the housing structure of the machine.

Preferably, the motor 9 track-ring 48 may also be attached to the first element 77 of the framework, and as illustrated, this can be performed by using semicylindrical surfaces 32, 85 in respective male and female members 78, 79 to clamp around a pair of pins 100, 101 protruding from end face 103 of the track-ring 48.

Although the second element 110 of the framework can very well also be comprised of male and female members that wrap around the pintle-valve and pivot pin in the manner and form already described for the first element 77, an alternative form for the second elements 110 as here illustrated, is a pressed steel "L" shaped plate. One arm shown as 111 of element 110 is provided with an aperture 112 into which the pintle-valve 20 protrudes through. Likewise, a further aperture 113 is included through which the pivot pin 50 protrudes through. The arm or base 115 of element 110 is provided with two holes through which fastening screws 120, 121 pass through, and whereby when screws 120, 121 are inserted and tightened into their corresponding holes 123 in cover 4, the second element 110 of the framework is thereby fixedly held to the machined surface 73 in the cover 4.

The fastening of both first and second elements 77, 110 of the framework to the cover member 4 is completed prior to the attachment of the case member 3 to the cover 4.

Figure 7:
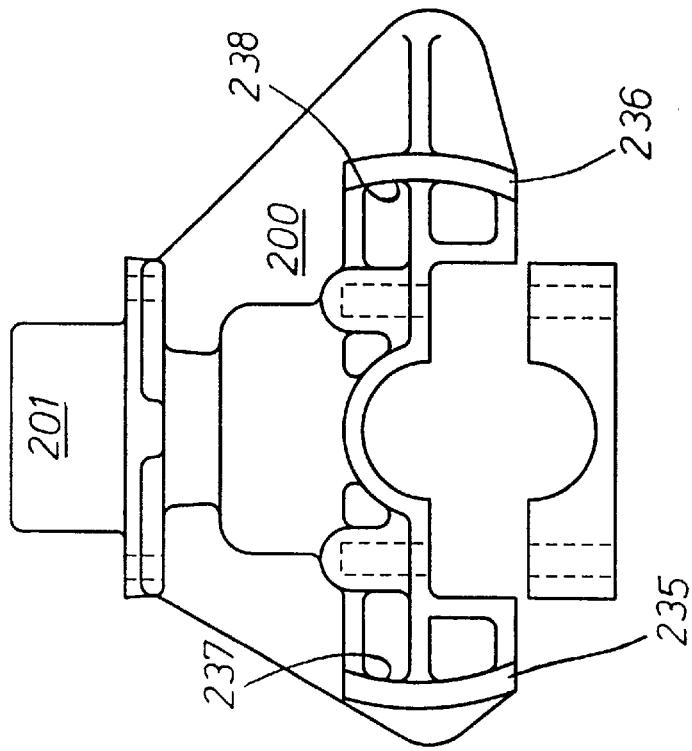
FIG. 7 is a view of the rear of the subsidiary housing member taken along line V—V.
Figure 4:
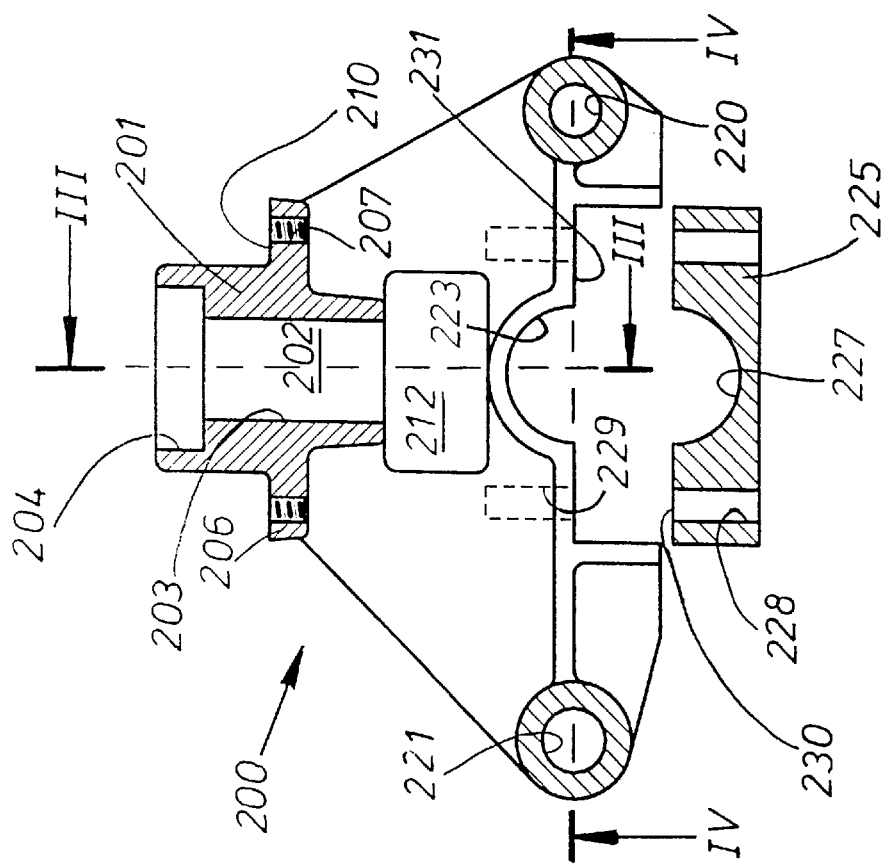
FIG. 4 is a part-sectioned side view of the subsidiary housing member that acts in part as the support framework for the hydrostatic transmission according to the second embodiment of the invention.
Figure 6:
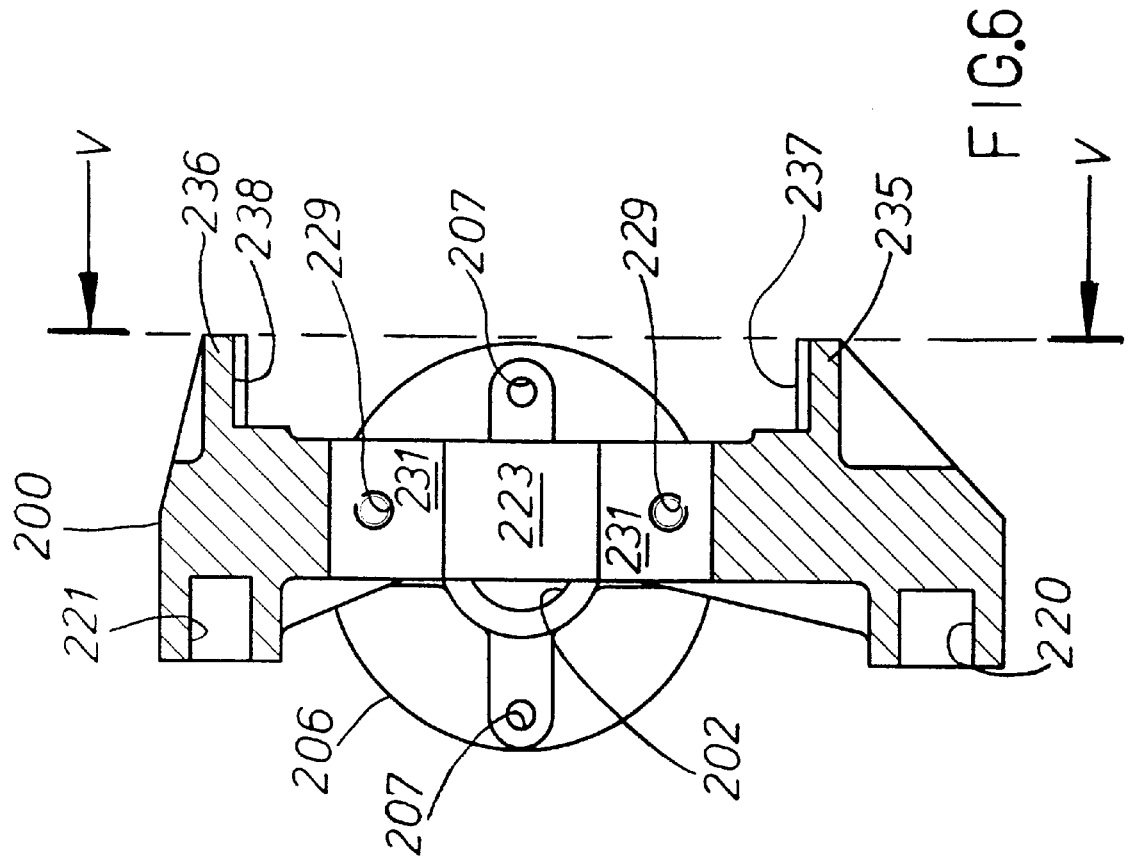
FIG. 6 is a partial view along section IV—IV of FIG. 4.
Figure 5:
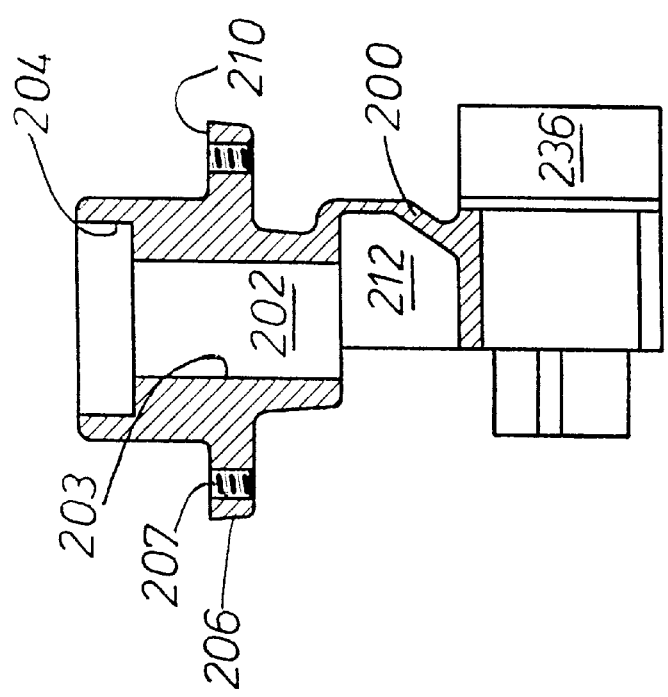
FIG. 5 is a part-sectioned view along section III—III of FIG. 4.
Figure 8:
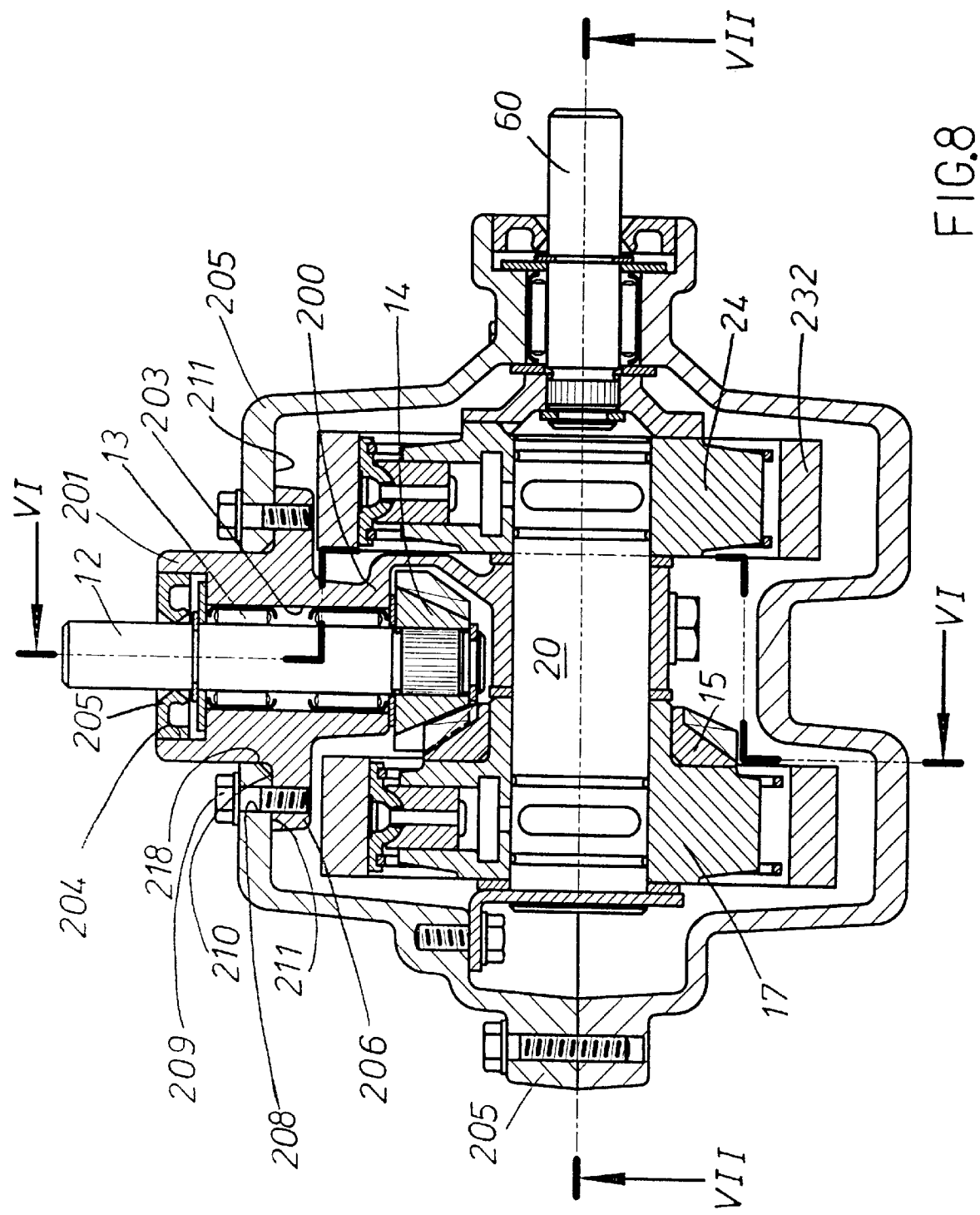
FIG. 8 is a part-sectioned side view of the complete hydrostatic transmission according to the second embodiment of the invention.
Figure 9:
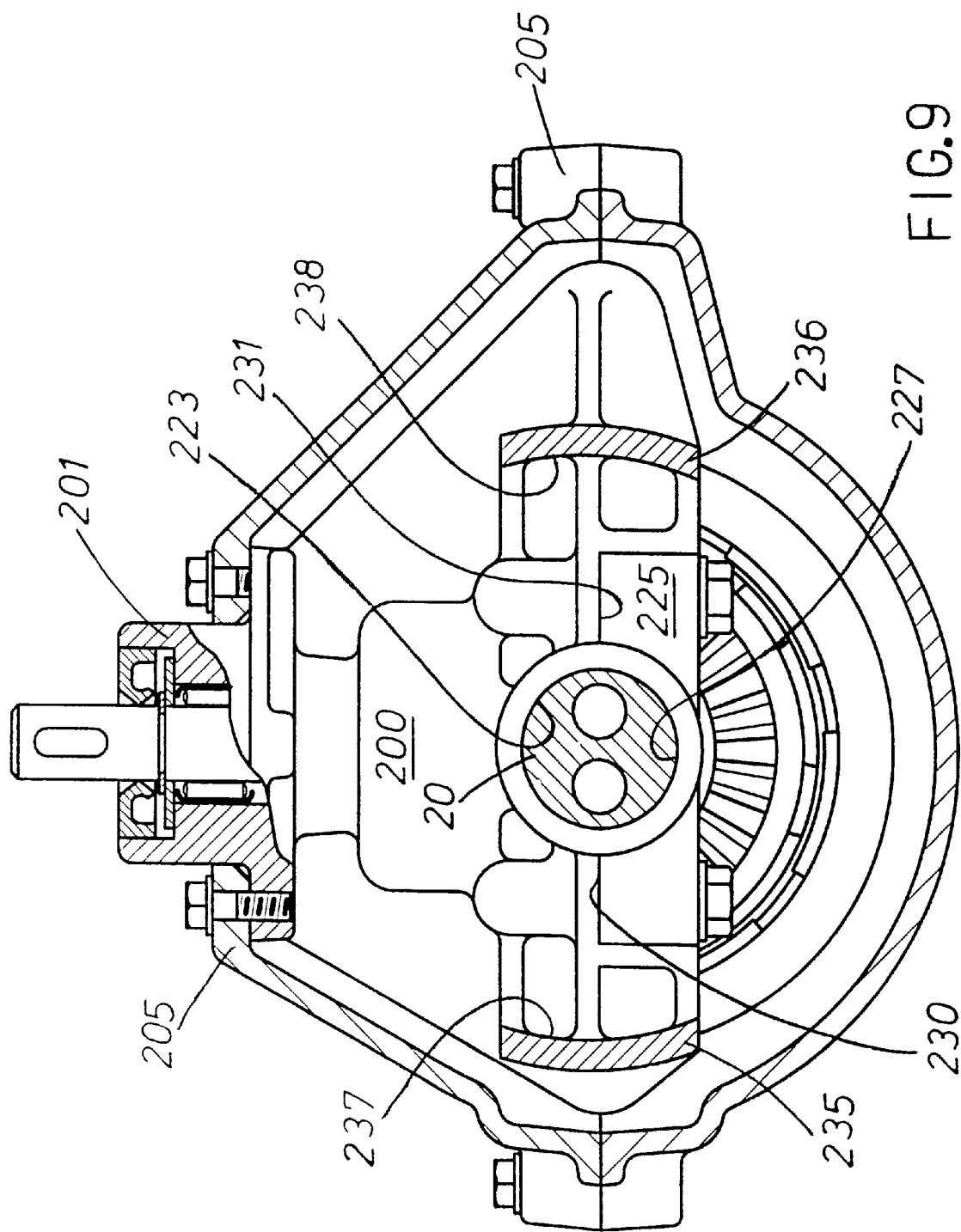
FIG. 9 is a part-sectioned view along section VI—VI of FIG. 8.
Figure 10:
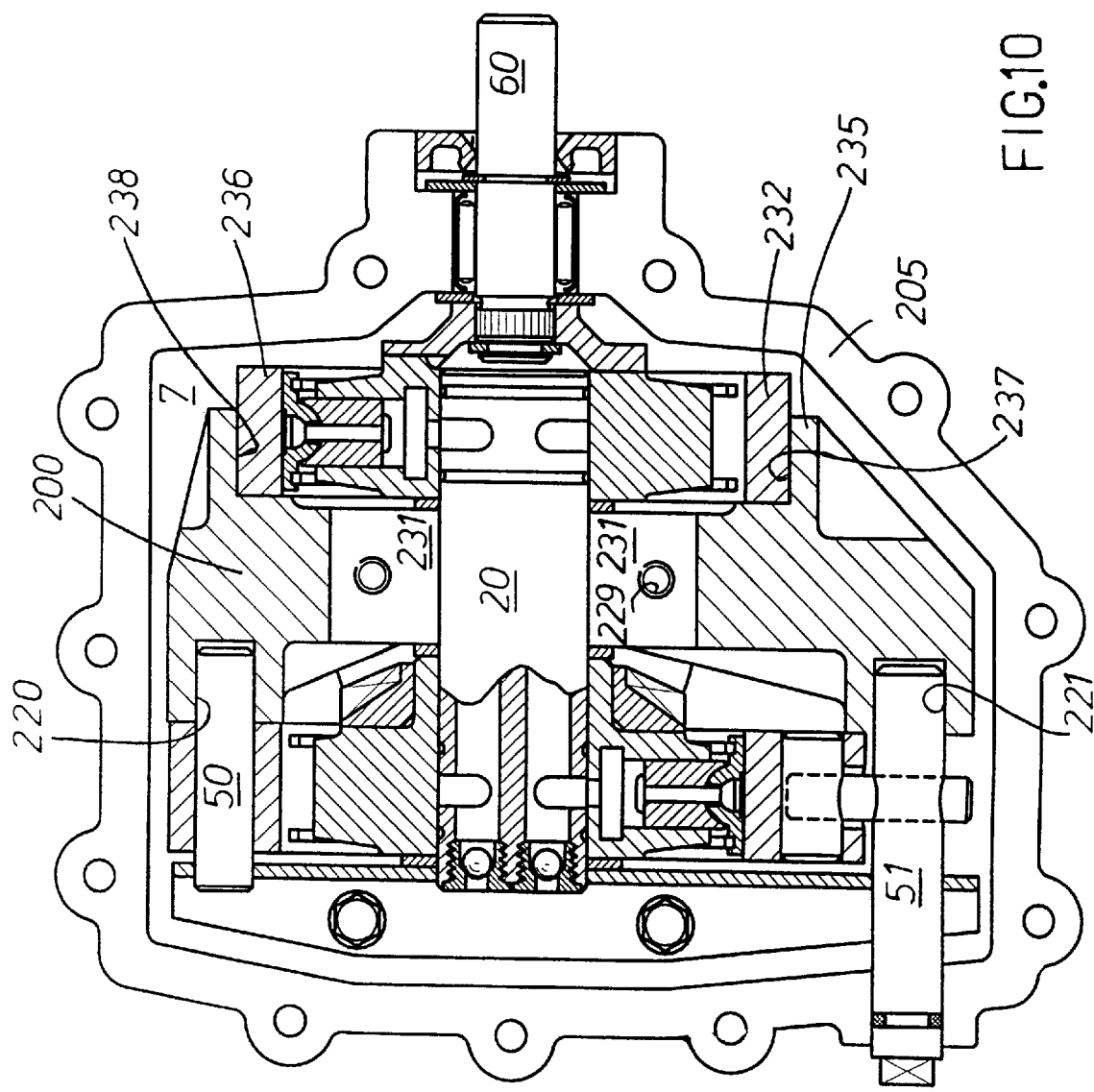
FIG. 10 is a part-sectioned view along section VII—VII of FIG. 8.

FIGS. 4 to 10 illustrate a further embodiment of the invention where a subsidiary housing member acts as the framework to hold the components of the hydrostatic transmission. FIGS. 4 to 7 show the subsidiary housing member without the hydrostatic components whereas FIGS. 8 to 10 show how the hydrostatic transmission inter-relates with the subsidiary housing in the case and cover. As numerous components are identical in form as that shown and described in the earlier embodiment, they are shown with the same reference numbers.

The subsidiary housing member as indicated as 200 has an integrally extending boss portion shown as 201 containing opening 202 and in which cylindrical surfaces 203, 204 are arranged. Bearings 13 are seated on cylindrical surface 203 and a rotary seal 205 in cylindrical surface 204. Input drive-shaft 12 extends through opening 202. The boss portion 201 includes a radially outwardly extending flange shown as 206, and the upper surface of the flange 206 shown as 210 is the flange junction surface that abuts against a complementary surface 211 formed on the interior of the cover member 205. Opening 218 is provided in the cover member 205 so that the boss portion 201 of the subsidiary housing member 200 can extend through. Surface 211 in case member 205 is provided with a plurality of holes 208 which co-operate with threaded holes 207 and where screws 209 are ueed to lock the flange 206 fast against surface 211.

Subsidiary housing member 200 is provided with an aperture 212 where the bevel pinion 14 lies, and holes 220, 221 into which are located the pivot pin 50 and control pin 53. A part-cylindrical pocket 223 is also provided and acts in combination with a part-cylindrical pocket 227 provided in saddle-clamp 225 to hold the pintle-valve 20 in position. As shown, bolt holes 228 correspond with holes 229 in subsidiary housing member 200 so that saddle-clamp 225 can be fixed to the subsidiary housing member 200, the base or bottom surface 230 of saddle-clamp 225 abutting with the base surface 231 of subsidiary housing member 200. As shown in FIGS. 7 and 9, the rear side of subsidiary housing member 200 is provided with outwardly extending wings 235, 236 inside which the cylindrical track-ring 232 for the hydraulic motor is located between respective part-cylindrical surfaces 237, 238.

It is to be understood that while we have illustrated and described two embodiments of our invention, it is not to be limited to any one specific form or arrangement of parts herein described and shown except insofar as such limitations are included in the claims.

We claim:

1. A hydrostatic transmission comprising a housing constituted by a case member and a cover member and where said case member and said cover member are disposed adjacent one another along a peripheral seam to define an internal chamber, and where the interior of said cover member is provided with mounting surfaces or downwardly extending bosses; said hydrostatic transmission comprising a radial piston pump and a radial piston motor together disposed within said internal chamber, and where said radial piston pump is fluidly coupled to said radial piston motor by a pintle-valve; an input drive-shaft rotatably supported in said housing by at least one bearing and operatively connected to a cylinder-barrel of said radial piston pump; an output drive-shaft rotatable supported in said housing by at least one bearing and operatively connected to a cylinder-barrel of said radial piston motor; respective cylinder-barrels of said radial piston pump and said radial piston motor having an array of cylinders each containing a piston and where the pistons in each of said cylinder-barrels are operatively connected to respective surrounding annular track-rings; a framework disposed within said internal chamber to which said pintle-valve and said track-rings are fastened to, said framework being fixedly secured to said mounting surfaces or downwardly extending bosses; wherein said motor track ring is supported by said housing only through said framework.

2. A hydrostatic transmission according to claim 1 wherein said mounting surfaces or downwardly extending bosses are offset from said peripheral seam.

3. A hydrostatic transmission according to claim 2 wherein said input drive-shaft is operatively connected to said cylinder-barrel of said radial piston pump by bevel gearing.

4. A hydrostatic transmission according to claim 1 wherein said framework comprises first and second elements, said first and second elements being in spaced relationship with respect to each other and said cylinder-barrel of said radial piston pump being disposed in-between.

5. A hydrostatic transmission according to claim 4 wherein said radial piston pump and said radial piston motor are positioned on opposite sides of the first of said elements.

6. A hydrostatic transmission according to claim 4 wherein the first of said elements is attached to said downwardly extending bosses in said cover member and where the second of said elements is attached to said interior mounting surfaces in said cover member.

7. A hydrostatic transmission according to claim 4 wherein the first of said elements comprises male and female members each of which being provided with a respective part-cylindrical surface to locate and support said pintle-valve, said male and female members being positioned together along a parting-plane formed there between to act in their combined condition as a clamp such that said pintle-valve remains fixed in its spaced relationship with respect to said housing, and where a plurality of fastening screws are arranged to pass through said male and female members to lock said first of said elements to said cover member.

8. A hydrostatic transmission according to claim 7 wherein said parting-plane between said male and female members is coincident with said peripheral seam.

9. A hydrostatic transmission according to claim 7 wherein said said male and female members are formed in powder-metal.

10. A hydrostatic transmission according to claim 4 wherein the second of said elements is of "L" shape plate construction having first and second arms, an aperture provided in the first of said arms to locate and support said pintle-valve, mounting holes in the second of said arms for the attachment of said second of said elements to said interior mounting surfaces provided in said cover member by means of a plurality of fastening screws.

11. A hydrostatic transmission according to claim 1 wherein said framework comprises first and second elements, said first and second elements being in spaced relationship with respect to each other and said cylinder-barrel of said radial piston pump being disposed in-between; the first of said elements comprising a male and female member and each having a part-cylindrical surface such that said male and female members are positioned together along a parting-plane formed there between coincident with the longitudinal axis of said pintle-valve for providing primary support for said pintle-valve; said second of said elements comprising a "L" shape construction having an aperture through which said pintle-valve extends through for providing secondary support of said pintle-valve.

12. A hydrostatic transmission according to claim 11 wherein said first of said elements is attached to said downwardly extending bosses in said cover member and where said second of said elements is attached to said interior mounting surfaces in said cover member.

13. A hydrostatic transmission according to claim 1 wherein the axis of rotation of said input drive-shaft is arranged to be perpendicular with respect to the rotational axis of said output drive-shaft.

14. A hydrostatic transmission comprising a housing constituted by a case member and a cover member and where said case member and said cover member are disposed adjacent one another along a peripheral seam to define an internal chamber, and where the interior of said cover member is provided with mounting surfaces or downwardly extending bosses; said hydrostatic transmission comprising a radial piston pump and a radial piston motor together disposed within said internal chamber, and where said radial piston pump is fluidly coupled to said radial piston motor by a pintle-valve; an input drive-shaft rotatably supported in said housing by at least one bearing and operatively connected to a cylinder-barrel of said radial piston pump; an output drive-shaft rotatably supported in said housing by at least one bearing and operatively connected to a cylinder-barrel of said radial piston motor; respective cylinder-barrels of said radial piston pump and said radial piston motor having an array of cylinders each containing a piston and where the pistons in each of said cylinder-barrels are operatively connected to respective surrounding annular track-rings; a framework disposed within said internal chamber and fastened to said housing and upon which are mounted said pintle-valve and said track-rings, said framework acting to absorb all the forces generated by said track-ring of said radial piston motor.

15. A hydrostatic transmission according to claim 14 wherein said framework comprises first and second elements, said first and second elements being in spaced relationship with respect to each other and said cylinder-barrel of said radial piston pump being disposed in-between; the first of said elements comprising a male and female member and each having a part-cylindrical surface such that said male and female members are positioned together along a parting-plane formed there between coincident with the longitudinal axis of said pintle-valve to provide primary support for said pintle-valve; said second of said elements comprising a "L" shape construction having an aperture through which said pintle-valve extends through to provide secondary support for said pintle-valve.

16. A hydrostatic transmission comprising a housing constituted by a case member, a cover member and a subsidiary housing member, said cover member being provided with all opening through which a portion of said subsidiary extends through and where said case member and said cover member are disposed adjacent one another along a peripheral seam to define an internal chamber; said hydrostatic transmission comprising a radial piston pump and a radial piston motor together disposed within said internal chamber, and where said radial piston pump is fluidly coupled to said radial piston motor by a pintle-valve; an input drive-shaft rotatably supported in said subsidiary housing member by at least one bearing and operatively connected to a cylinder-barrel of said radial piston pump; an output drive-shaft rotatable supported in said housing by at least one bearing and operatively connected to a cylinder-barrel of said radial piston motor; respective cylinder-barrels of said radial piston pump and said radial piston motor having an array of cylinders each containing a piston and where the pistons in each of said cylinder-barrels are operatively connected to respective surrounding annular track-rings; said subsidiary housing member acting as a framework to absorb the forces generated by the pressure medium flowing between said radial piston pump and said radial piston motor, and where a flange junction surface is provided on said subsidiary housing member to engage and be fixed to a mounting surface provided on said cover member.

17. A hydrostatic transmission according to claim 16 wherein a saddle clamp is attached to said subsidiary housing member to clamp said pintle-valve in position, said saddle clamp joining said subsidiary housing member along a junction surface coincident with the peripheral seam.

18. A hydrostatic transmission according to claim 16 wherein said subsidiary housing member further supports a pivot-pin and control-pin for the said radial piston pump.

19. A hydrostatic transmission according to claim 16 wherein said subsidiary housing member is further provided with two extending wings to support the track-ring of the said radial piston motor.

20. A hydrostatic transmission according to claim 16 wherein said junction surface is offset from said peripheral seam.

* * * * *